March 16, 1965 P. MONGITORE 3,173,344
PISTONS WITH BALL AND SOCKET CONNECTING ROD JOINT
Filed Sept. 3, 1963

United States Patent Office 3,173,344
Patented Mar. 16, 1965

3,173,344
PISTONS WITH BALL AND SOCKET
CONNECTING ROD JOINT
Pietro Mongitore, 122 Corso Ferrucci, Turin, Italy
Filed Sept. 3, 1963, Ser. No. 306,238
Claims priority, application Italy, Sept. 6, 1962,
17,732/62; July 27, 1963, 15,889/63
2 Claims. (Cl. 92—187)

In driving and working machines in which a fluid performs a thermodynamic cycle of any type in a variable volume chamber, especially in rotary machines, the movable part effecting variations in volume may have to sealingly slide over the chamber walls though its movement is not parallel to the latter. Generally, a cylinder bore having a straight or curved axis of circular or any other cross-sectional shape is provided, in the specific case neither the spacing of the two relatively sliding parts nor the angle formed thereby is constant.

If sealing rings or segments are provided between the two parts, the former perform a variable movement, their relative positions being at a variable angle, which results in unsatisfactory or impossible sealing, whereas the latter is essential for efficiency of the machine.

The above drawback is obviated by the invention which consists in adopting a special tumbler-shaped member in the chamber between the relatively sliding parts.

The invention is explained by the following description of non-limiting embodiments which are diagrammatically shown on the accompanying drawings.

Figure 1:
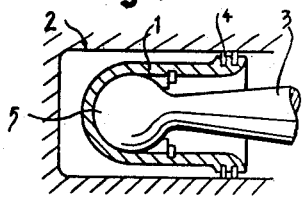
FIGURES 1 through 5 are axial sectional views showing the position of the tumbler-shaped member in a piston assembly.

The tumbler-shaped member is provided with reference numerals 1, 1*bis*, respectively, in the various figures, which show certain among the large number of possible embodiments, and is located between the walls of the chamber 2 and movable part 3.

Figure 2:
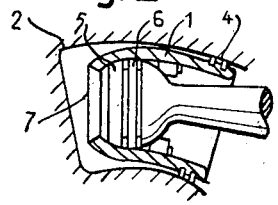
Figure 6:
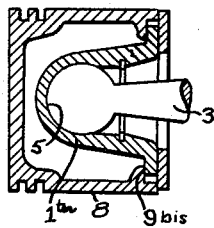
FIGURES 6 through 8 are axial sectional views of the piston showing its connection to a piston rod in the preferred embodiment of the invention.
Figure 3:
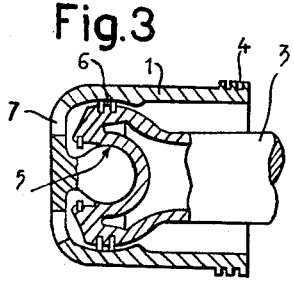

In FIGURES 1, 2 and 3 the tumbler-shaped member 1 is formed with grooves for the sealing segments or rings 4, which slide over its walls, and with an internal concave or convex region 5 forming a ball, cylindrical or Cardan joint, respectively, capable of oscillation about the movable part 3. The parts 2 and 3 are at a variable angle to each other, the part 3 being constantly linked with respect to part 2, so that the tumbler-shaped member 1 takes a variable position, such that the segments or rings 4 slide by a movement which is parallel or nearly so to the walls 2; the joint 5 admitting the cyclic deflection due to the link.

When necessary, sealing segments or rings 6 arranged in the part 1 or 3, respectively, can be interposed between the said parts 1 and 3.

In order to relieve the tumbler-shaped member 1 from the overall pressure in the "cycle chamber" over the cross-section of the bore, the tumbler-shaped member may be formed with holes 7, so that pressure impinges the part 3 direct on its surface to the contour of the segments or rings 6, whereby the tumbler-shaped element merely transmits the remainder of the pressure acting between the segments or rings 4 and 6, the overall pressure in the chamber acting on the part 3.

The tumbler-shaped member can perform an oscillatory motion of any kind, such as in a plane, similarly to conventional connecting rods, subjected to buckling stresses or the oscillatory movement can be a variable one as with struts having a spherical head; however, the tumbler-shaped member is subjected to traction stress. In the case of suction or under special inertia forces from the piston, a conventional connecting rod is stretched, whereas under similar conditions the tumbler-shaped element is compressed.

The tumbler-shaped member 1 reaches into the "cycle chamber" and is therefore exposed in internal combustion engines to high temperatures which should be taken care of.

Figure 4:
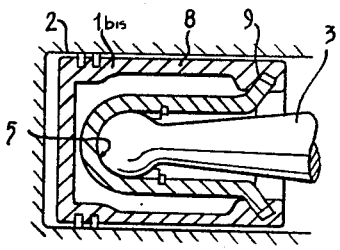
Figure 5:
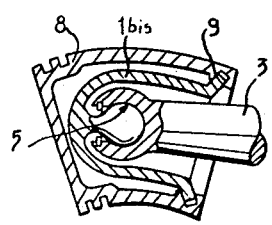
Figure 8:
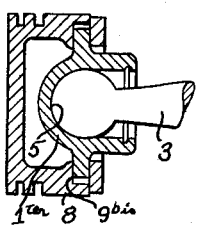

If a conventional piston 8 acts in the barrel 2 and sealing segments or rings are provided, as in FIGURES 4 and 5, the piston is subjected to the overall pressure in the cycle chamber. In order to transfer such pressure to the movable part 3 performing a variable relative movement to the part 2, hence to the piston 8, the tumbler-shaped member 1*bis* maintains its articulation 5 to the part 3, but the segments 4 can be dispensed with. The tumbler-shaped element is moreover provided with an articulation 9 to the piston 8. The joint 9 can be of the Cardan, cylindrical or ball type, its center being located anywhere, even at a remote point. This results in a restricted space in a double articulation with any, even wide spacing of the centers, which considerably shortens a unit comprising a piston and connecting rod or articulated strut by the whole spacing of the centers of the ends of the latter.

The tumbler-shaped member 1*bis* does not reach into the "cycle chamber," and is therefore relieved from the high temperatures occurring in internal combustion engines.

The tumbler-shaped member 1 or 1*bis* and piston 8 are not subject to the high transverse components of the pressures acting on a conventional piston by effect of the inclination of the connecting rod. With the instant tumbler-shaped member such transverse forces are always very low as they almost wholly originate from friction at the articulated joints. Consequently, the tumbler-shaped member 1 or 1*bis* and piston 8 always are very light in weight and short enough.

The sealing rings or segments 4 and 6 for the tumbler-shaped member and for the piston 8, respectively, can be of the usual type, wherever possible, or they can be of the type disclosed by U.S. patent application Ser. No. 80,619, filed January 4, 1961, now Patent 3,106,404, granted October 8, 1963.

Moreover, if the center of the spherical joint 9 is at the infinite, the socket becomes flat, normal to the path, or, if desired, non-perpendicular to the latter as the articulation socket 9*bis* in FIGURES 6 to 9, in which 8 denotes a piston and 3 a strut. The flat 9*bis* can be located anywhere, such as adjacent the center of the other articulation 5, or extend through said center, either perpendicular or inclined to the path. In this manner, as shown by FIGURES 6 to 9, the length of the tumbler-shaped member 1*ter* becomes very small or negligible, whereby the overall size of the device is very short or narrow which results in technical, economical and functional advantages by virtue of the smaller size and weight, while allowing any deflection of the strut 3 from the path of the piston 8 due to their interlinking, as well as any deformation or expansion due to cyclic variations in pressures and temperatures.

FIGURES 6 to 9 show embodiments of the device. It will be seen that in certain cases the joint may be simply of a known type. In any case the use of the joint for the above indicated purpose is novel considering that the crank pin or spherical joint or shoe only, respectively, has been employed heretofore in operating and working machines to admit transverse displacements only or exclusively angular deflections only.

Figure 7:
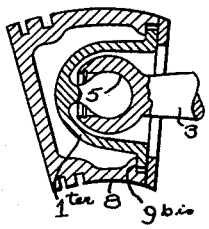
Figure 9:
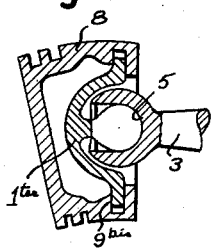
FIGURE 9 is an axial sectional view of the piston and piston rod in an alternative embodiment.

In FIGURES 7 and 9 the spherical region 5 or the strut 3 is concave, the tumbler-shaped member 1*ter* includes a convex spherical portion.

What I claim is:

1. In a piston assembly, a piston including a skirt portion having an inner wall; a piston rod; joint means comprising a ball and socket means for connecting said piston to the piston rod; an outturned flange fixed to said socket; and means for slidably mounting said outturned flange in a plane transverse to the longitudinal axis of said piston.

2. A piston assembly as claimed in claim 1, wherein the means for slidably mounting said outturned flange comprises means defining an annular recess in the inner wall of said skirt portion, transversely to the longitudinal axis thereof; said means defining said annular recess including flat side walls and an outer peripheral wall having a diameter greater than the diameter of said outturned flange; whereby the sides of said flange will bear on the flat side walls of said annular recess, and the flange may slide in said annular recess in a plane transverse to the longitudinal axis of said piston.

References Cited by the Examiner

UNITED STATES PATENTS

| | | |
|---|---|---|
| 320,839 | 6/85 | Brotherhood 92—179 |
| 373,072 | 11/87 | Jarvis 92—179 X |
| 872,786 | 12/07 | Beazell 92—187 X |
| 957,984 | 5/10 | Mowry 92—179 |
| 1,294,538 | 2/19 | Rose 92—187 X |
| 1,298,234 | 3/19 | Lowther 92—187 X |
| 1,332,760 | 3/20 | Saitta 92—187 X |
| 1,350,747 | 8/20 | Stenger 92—187 X |
| 1,419,736 | 6/22 | Johnston 92—187 |
| 1,456,727 | 5/23 | Franchi 92—187 |
| 1,474,325 | 11/23 | Kallmeyer 92—187 |
| 1,515,802 | 11/24 | Watson 92—187 X |
| 1,529,574 | 3/25 | Chorlton 92—187 |
| 1,534,728 | 4/25 | Noad 92—187 |
| 1,543,498 | 6/25 | Hammond 92—187 |
| 1,543,652 | 6/25 | Sunderman 92—187 |
| 1,775,892 | 9/30 | Salardi 92—179 X |
| 1,787,556 | 1/31 | Smith 92—179 |
| 1,787,638 | 1/31 | Moore 92—187 X |
| 1,829,552 | 10/31 | Weatherhead 92—179 |
| 2,107,795 | 2/38 | Larsh 92—187 |
| 2,232,802 | 2/41 | Retschy 92—187 X |
| 2,296,469 | 9/42 | Kastler 92—187 |
| 2,396,500 | 3/46 | Gasser 92—179 X |
| 2,902,987 | 9/59 | Schweitzer et al. 92—187 X |
| 3,095,221 | 6/63 | Kaup 92—179 X |

RICHARD B. WILKINSON, *Primary Examiner.*